US011145129B2

(12) United States Patent
Dubovsky et al.

(10) Patent No.: US 11,145,129 B2
(45) Date of Patent: Oct. 12, 2021

(54) AUTOMATIC GENERATION OF CONTENT FOR AUTONOMIC AUGMENTED REALITY APPLICATIONS

(71) Applicant: International Business Machines Corporation, Armonk, NY (US)

(72) Inventors: Oded Dubovsky, Haifa (IL); Adi Raz Goldfarb, Akko (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 16/681,888

(22) Filed: Nov. 13, 2019

(65) Prior Publication Data
US 2021/0142570 A1 May 13, 2021

(51) Int. Cl.
*G06T 19/00* (2011.01)
*G06T 17/00* (2006.01)
*G06T 19/20* (2011.01)
*G06T 7/73* (2017.01)

(52) U.S. Cl.
CPC .............. *G06T 19/006* (2013.01); *G06T 7/74* (2017.01); *G06T 17/00* (2013.01); *G06T 19/20* (2013.01); *G06T 2207/10028* (2013.01); *G06T 2207/30241* (2013.01); *G06T 2207/30244* (2013.01); *G06T 2219/004* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 2017/0280188 | A1 | 9/2017 | Mullins |
| 2019/0056779 | A1 | 2/2019 | Guven et al. |
| 2019/0089833 | A1 | 3/2019 | Amir et al. |
| 2019/0095712 | A1 | 3/2019 | Jung et al. |
| 2020/0005538 | A1* | 1/2020 | Neeter ...................... G06T 7/33 |
| 2021/0049784 | A1* | 2/2021 | Torok ................... G01C 11/025 |

* cited by examiner

*Primary Examiner* — Jennifer Mehmood
*Assistant Examiner* — Jed-Justin Imperial
(74) *Attorney, Agent, or Firm* — Daniel Swirsky (57) ABSTRACT

Automatically generating augmented reality (AR) content by constructing a three-dimensional (3D) model of an object-including scene using images recorded during a remotely-guided AR session from a camera position defined relative to first 3D axes, the model including camera positions defined relative to second 3D axes, registering the first axes with the second axes by matching a trajectory derived from the image camera positions to a trajectory derived from the model's camera positions for determining a session-to-model transform, translating, using the transform, positions of points of interest (POIs) indicated on the object during the session, to corresponding POI positions on the object within the model, where the session POI positions are defined relative to the first axes and the model POI positions are defined relative to the second axes, and generating a content package including the model, model POI positions, and POI annotations provided during the session.

19 Claims, 5 Drawing Sheets

AUTOMATIC GENERATION OF CONTENT FOR AUTONOMIC AUGMENTED REALITY APPLICATIONS

BACKGROUND

In one type of augmented reality (AR) application, a user's physical surroundings are, in real time, recorded by a video camera and presented to the user on a video display together with digital content, such as computer-generated text or images, that are not found in the user's physical surroundings. Such AR applications are often used to provide training and assistance to users who work with equipment by identifying points of interest (POIs) on such equipment, visually indicating an identified POI to the user together with a text annotation describing the POI, and often also displaying other step-by-step text instructions as well.

Specific implementations of this type of AR application include remotely-guided AR applications and autonomic AR applications. In remotely-guided AR applications, while a user views video of the user's physical surroundings on a video display, the video is simultaneously transmitted to a remote viewer who, using computer software, indicates POIs on objects appearing in the video and provides associated text annotations and step-by-step text instructions that are immediately transmitted back to the user and presented on the user's video display. In autonomic AR applications, a computer-based and typically three-dimensional digital model of a real-world object is created, POIs are indicated on the object within the model, and POI annotations and step-by-step text instructions are added to the model. Thereafter, while a user views video of the real-world object in the user's physical surroundings on a video display, step-by-step text instructions from the model are displayed on the user's video display, and the video is analyzed by computer software to register the model of the object with the real-world object given its current orientation and the current viewing angle. The model-based POIs and annotations are then projected from model space to their correct position on the user's video display.

While remotely-guided AR has the advantage of not requiring a model and associated content to be prepared in advance, it has the disadvantage of requiring the involvement of a remote viewer in real time, and POIs must be redefined by the remote viewer during each AR session. And while autonomic AR has the advantage of not requiring the involvement of a remote viewer in real time and of POI reuse, it has the disadvantage of requiring a model and associated content to be prepared in advance.

SUMMARY

In one aspect of the invention a method is provided automatically generating content configured for use with an autonomic augmented reality system, the method including constructing a three-dimensional model of a scene that includes an object, where the constructing is performed using a plurality of images of the scene recorded during a remotely-guided augmented reality session, where each of the images is recorded from a camera position defined relative to a first set of three-dimensional axes associated with the images, and where the three-dimensional model includes a plurality of camera positions defined relative to a second set of three-dimensional axes associated with the three-dimensional model, registering the first set of three-dimensional axes with the second set of three-dimensional axes by matching a trajectory derived from the camera positions of the images to a trajectory derived from the camera positions of the three-dimensional model, thereby determining a session-to-model transform, translating, using the session-to-model transform, positions of a plurality of points of interest indicated on the object during the remotely-guided augmented reality session, to positions of corresponding points of interest on the object within the three-dimensional model, where the positions of the points of interest indicated on the object during the remotely-guided augmented reality session are defined relative to the first set of three-dimensional axes and the positions of the corresponding points of interest on the object within the three-dimensional model are defined relative to the second set of three-dimensional axes, and generating a content package configured for use with an autonomic augmented reality system, where the content package includes the three-dimensional model, the positions of the points of interest on the object within the three-dimensional model, and annotations provided during the remotely-guided augmented reality session in association with the points of interest indicated on the object during the remotely-guided augmented reality session, where the constructing, registering, translating, and generating are implemented in any of a) computer hardware, and b) computer software embodied in a non-transitory, computer-readable medium.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
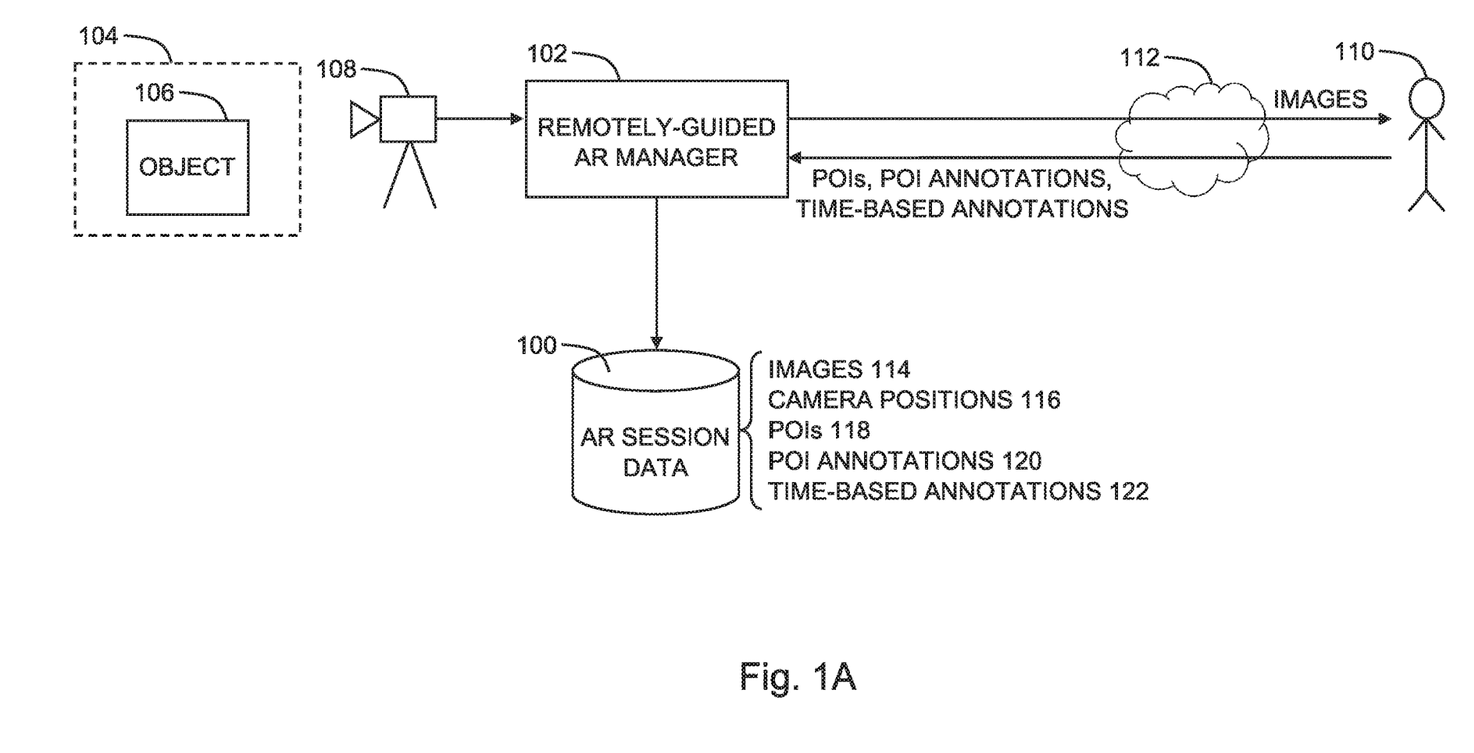
FIG. 1A is a simplified conceptual illustration of a remotely-guided augmented reality system.

Reference is now made to FIG. 1A, which is a simplified conceptual illustration of a remotely-guided augmented reality (AR) system. In the system of FIG. 1A, AR session data 100 are obtained in accordance with conventional techniques, such as where data 100 are obtained by a remotely-guided AR manager 102 during a remotely-guided AR session during which images of a scene 104 including an object 106 are captured by a camera 108 and transmitted to a remote viewer 110, such as via a computer network 112. Data 100 preferably include a set of one or more images 114 of scene 104, as well as per-image camera positions 116 for images 114, where each camera position 116 is defined relative to a first set of three-dimensional axes associated with images 114 in accordance with conventional techniques, and where the first set of three-dimensional axes is provided in accordance with conventional techniques. Data 100 also preferably include one or more points of interest (POI) 118 on object 106, as well as the position of each POI 118 defined relative to the first set of three-dimensional axes in accordance with conventional techniques, where each POI 118 is typically indicated on object 106 by remote viewer 110 during the remotely-guided AR session. Data 100 also preferably include one or more annotations 120, such as text annotations, associated with POIs 118, where each annotation 120 is typically provided in association with a corresponding POI 118 by remote viewer 110 during the remotely-guided AR session. Data 100 also preferably include time-based annotations 122, such as in the form of step-by-step guidance text, where each of the time-based annotations 122 is preferably associated with a different time offset relative to the start of the remotely-guided AR session, and where each time-based annotation 122 is typically provided by remote viewer 110 during the remotely-guided AR session. Data 100 also preferably include a per-image timestamp associated with images 114.

Figure 1B:
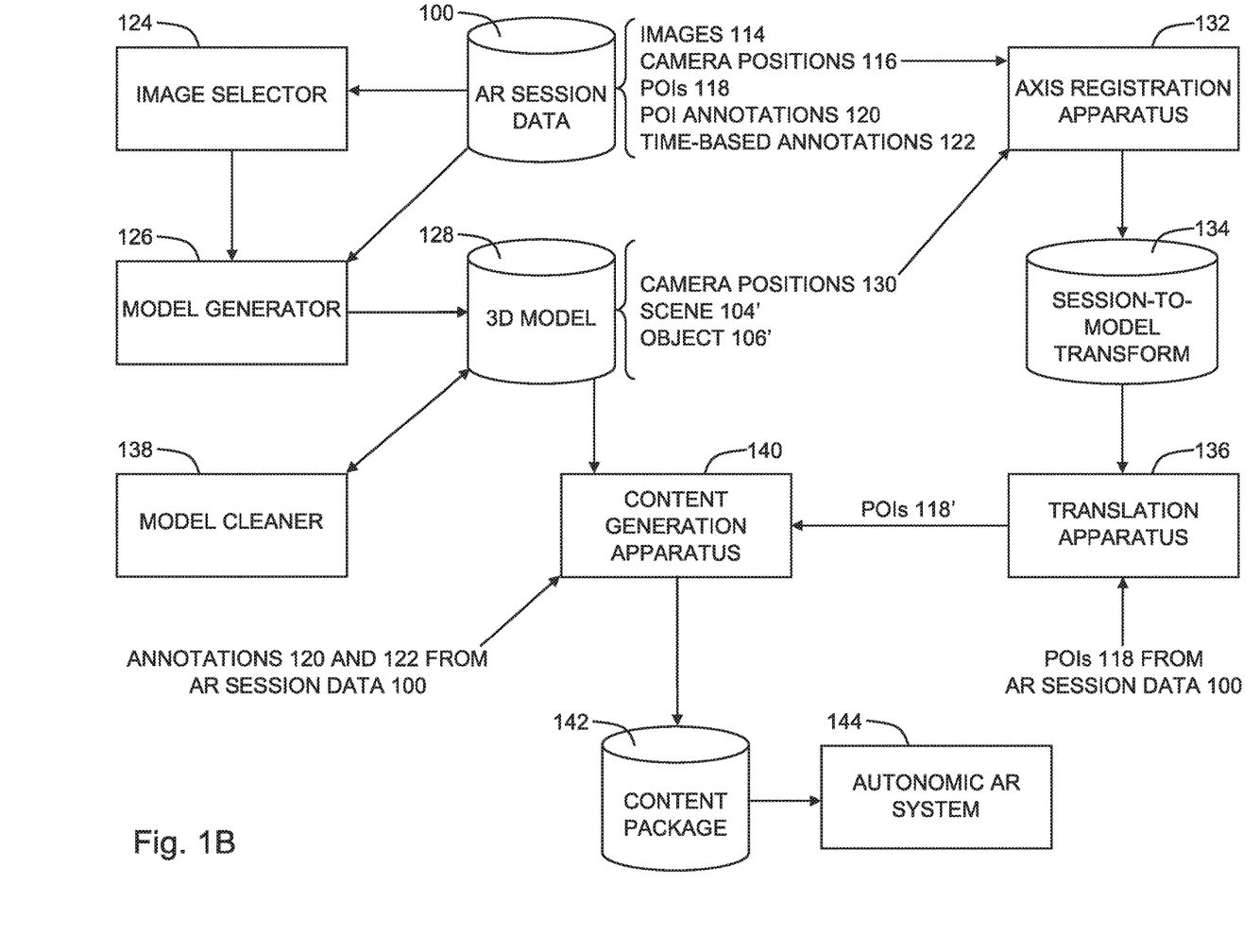
FIG. 1B is a simplified conceptual illustration of a system for automatic generation of content for autonomic augmented reality applications, constructed and operative in accordance with an embodiment of the invention.

Reference is now made to FIG. 1B, which is a simplified conceptual illustration of a system for automatic generation of content for autonomic augmented reality applications, constructed and operative in accordance with an embodiment of the invention. The system of FIG. 1B is preferably configured to receive as input AR session data such as is described hereinabove with reference to FIG. 1A.

An image selector 124 is configured to select specific images from images 114 based on predefined image selection criteria, such as in accordance with the method described hereinbelow with reference to FIG. 3.

A model generator 126 is configured to construct, in accordance with conventional techniques, a three-dimensional model 128 of scene 104 that includes object 106, now referred to within three-dimensional model 128 as scene 104' and object 106'. Model generator 126 is configured to construct three-dimensional model 128 using any of images 114, such as using only those of images 114 that are selected by image selector 124. Techniques that may be employed by model generator 126 to construct three-dimensional model 128 include any Structure From Motion technique or commercially-available software such as OpenMVG. Model generator 126 is also configured to include in three-dimensional model 128 one or more camera positions 130 defined relative to a second set of three-dimensional axes associated with three-dimensional model 128, where the second set of three-dimensional axes is provided in accordance with conventional techniques.

Axis registration apparatus 132 is configured to register, in accordance with conventional techniques, the first set of three-dimensional axes with the second set of three-dimensional axes by matching a trajectory derived from the camera positions 116 of images 114 to a trajectory derived from the camera positions 130 of three-dimensional model 128, and thereby determine a session-to-model transform function 134 for translating position information between the first and second sets of three-dimensional axes. Outlier camera positions are preferably identified for each of the trajectories using conventional techniques such as RANSAC and are not used to register the first and second sets of three-dimensional axes.

Translation apparatus 136 is configured to translate, using session-to-model transform function 134, the positions of POIs 118 on object 106 to positions of new corresponding POIs 118' on object 106' within three-dimensional model 128, by translating the positions of POIs 118 that are defined relative to the first set of three-dimensional axes to the positions of POIs 118' that are defined relative to the second set of three-dimensional axes. Translation apparatus 136 is also preferably configured to associate each annotation 120 with the POI 118' within three-dimensional model 128 that corresponds to the POI 118 with which the annotation 120 is associated, and optionally position each annotation 120 within three-dimensional model 128 near the POI 118' with which the annotation 120 is associated.

A model cleaner 138 is configured, in accordance with conventional techniques, to remove from three-dimensional model 128 any object within scene 104' that has no associated POIs 118'.

Content generation apparatus 140 is configured to generate a content package 142 configured for use with an autonomic AR system 144, where content package 142 includes three-dimensional model 128, the positions of POIs 118' on object 106' within three-dimensional model 128, and any of annotations 120 associated with POIs 118' and time-based annotations 122 together with their time offsets.

Any of the elements shown in FIG. 1B are preferably implemented by one or more computers in computer hardware and/or in computer software embodied in a non-transitory, computer-readable medium in accordance with conventional techniques.

Figure 2:
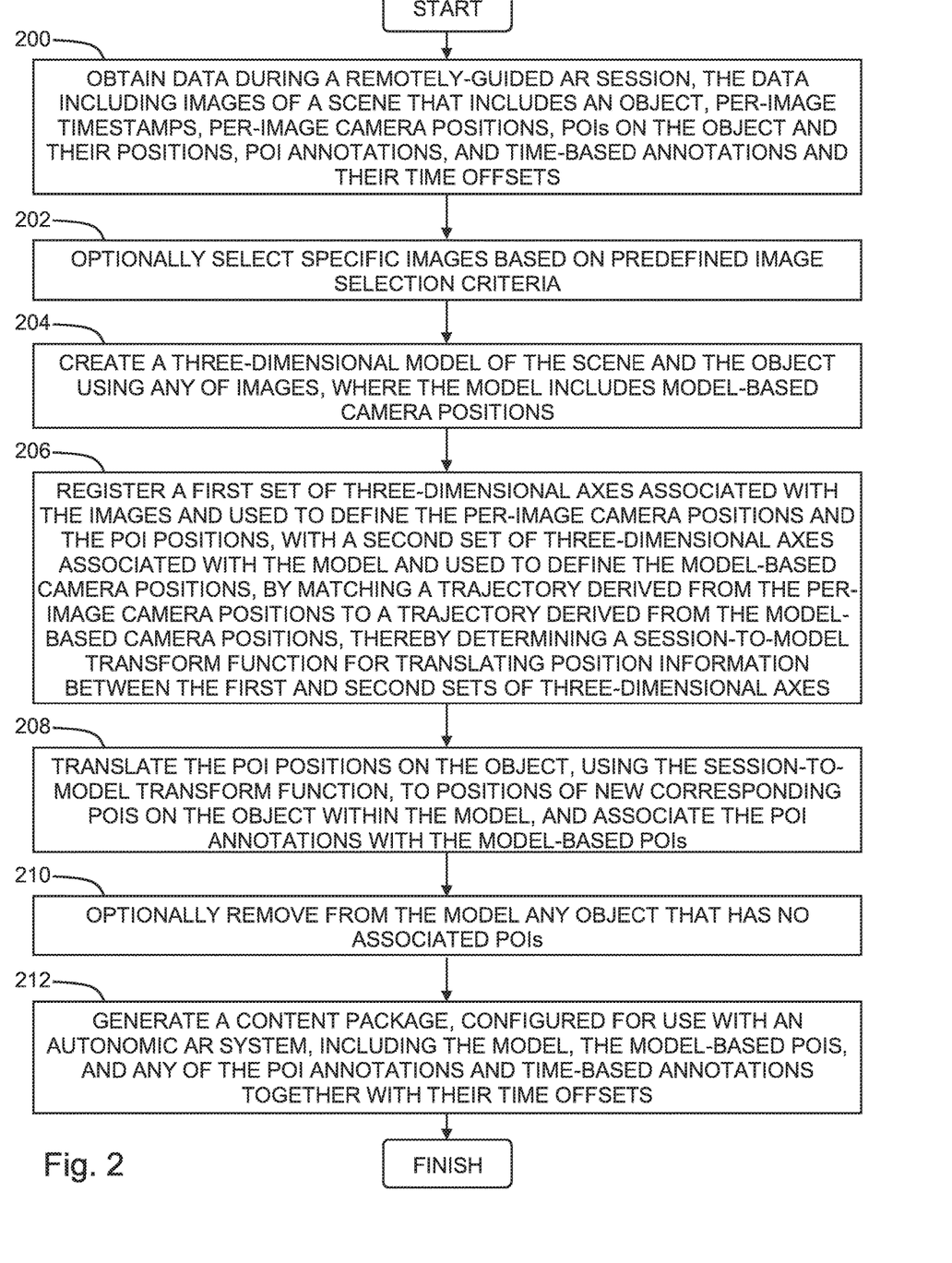
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1B, operative in accordance with an embodiment of the invention. In the method of FIG. 2, data are obtained during a remotely-guided AR session, the data including images of a scene that includes an object, per-image timestamps, per-image camera positions, POIs on the object and their positions, POI annotations, and time-based annotations and their time offsets (step 200). Specific images are optionally selected based on predefined image selection criteria (step 202). A three-dimensional model is created of the scene and the object using any of images, such as using only selected images, where the model includes model-based camera positions (step 204). A first set of three-dimensional axes associated with the images and used to define the per-image camera positions and the POI positions, is registered with a second set of three-dimensional axes associated with the model and used to define the model-based camera positions, by matching a trajectory derived from the per-image camera positions to a trajectory derived from the model-based camera positions, thereby determining a session-to-model transform function for translating position information between the first and second sets of three-dimensional axes (step 206). The POI positions on the object are translated, using the session-to-model transform function, to positions of new corresponding POIs on the object within the model, and the POI annotations are associated with the model-based POIs (step 208). Any object that has no associated POIs is optionally removed from the model (step 210). A content package is generated, configured for use with an autonomic AR system, and including the model, the model-based POIs, and any of the POI annotations and time-based annotations together with their time offsets (step 212).

Figure 3:
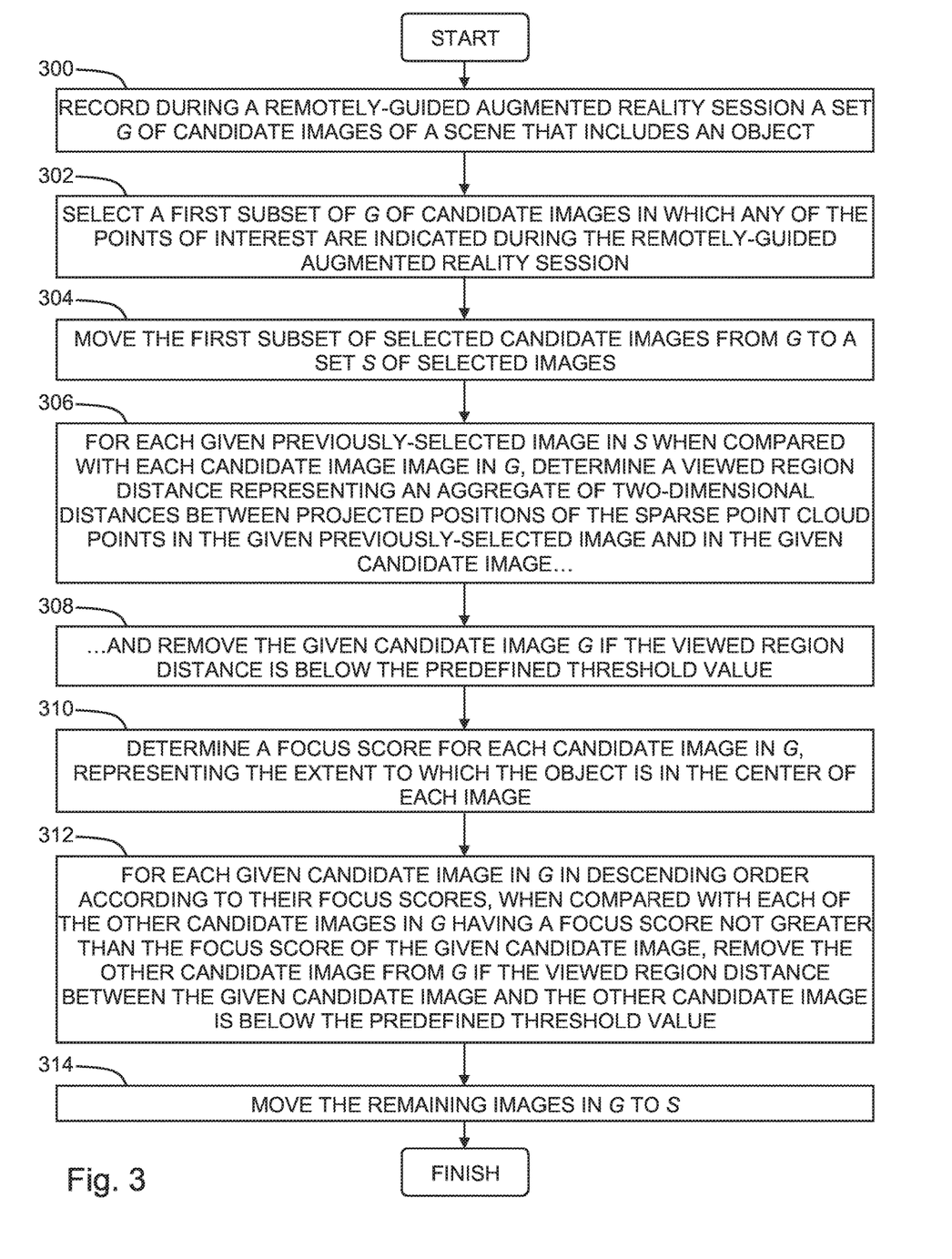
FIG. 3 is a simplified flowchart illustration of an exemplary method of operation of image selection for use with the system of FIG. 1B, operative in accordance with an embodiment of the invention.

Reference is now made to FIG. 3, which is a simplified flowchart illustration of an exemplary method of operation of image selection for use with the system of FIG. 1A and method of FIG. 2, operative in accordance with an embodiment of the invention. In the method of FIG. 3, a set G of candidate images of a scene that includes an object is recorded during a remotely-guided augmented reality session as described hereinabove (step 300). A first subset of the set G of candidate images is selected where in each candidate image of the first subset any of the points of interest are indicated during the remotely-guided augmented reality session (step 302). The first subset of selected candidate images is removed from the set G of candidate images and added to a set S of selected images (step 304).

A second subset of the set G of candidate images is selected as follows. For each given previously-selected image in set S when compared with each given candidate image in set G, a "viewed region distance" is determined, representing an aggregate of two-dimensional distances between projected positions of the sparse point cloud points in the given previously-selected image and in the given candidate image (step 306). This may be illustrated as follows. During a remote guidance session, a three-dimensional representation of a scene is preferably constructed in accordance with conventional techniques, where the three-dimensional representation is provided as sparse point cloud having n points as $\{P_k | k \in [1, 2, \ldots n]\}$. For any two-dimensional image $I_i$ and each three-dimensional scene point $P_k$, let $\pi_{i,k}$ represent the projection of $P_k$ to $I_i$ based on the camera position associated with $I_i$. For any pair of images $I_i$ and $I_j$, let $D_{i,j} = \Sigma_k \|\pi_{i,k} - \pi_{j,k}\|_2^2$, represent the viewed region distance between $I_i$ and $I_j$ as the aggregate of the two-dimensional distances between the projected positions of the sparse point cloud points in the two images. For a given image $I_i$, an image $I_j$ is considered to be similar to $I_i$ if $D_{i,j} < T$ for a predefined threshold T. Thus, once the viewed region distance is determined for a given previously-selected image in set S when compared with a given candidate image in set G, the given candidate image is removed from set G if the viewed region distance is below the predefined threshold value (step 308). Once the candidate images in set G have been compared in this manner to the previously-selected images in set S, the images remaining in set G represent the selected second subset of candidate images that may be moved to set S (step 314) after step 306 or after further processing as described below.

A third subset of the set G of candidate images is selected as follows. A "focus score" is determined for each candidate image in set G, representing the extent to which the object is in the center of each image (step 310). This may be illustrated as follows. Using the three-dimensional representation of the scene as described above in step 306:

---

For each 3D point $P_k$
  For each image $I_i$
    Let $\pi_{i,k}$ represent the projection of $P_k$ to $I_i$
    If $\pi_{i,k}$ is outside the boundaries of $I_i$
      $F_{i,k} = 0$
    else
      Let $d_{i,k} = \|\pi_{i,k} - C_i\|_2^2$ represent the distance of the projected point from the image center $C_i$       Let $F_{i,k} = \dfrac{1}{a + d_{i,k}^2}$ represent the focus score of the point $P_k$ in $I_i$

---

Consequently, $F_k = \Sigma_i F_{i,k}$ represents the aggregate focus score of each point $P_k$, and $F_i = \Sigma_k F_{i,k}$, represents the focus score for each image $I_i$ in set G. For each given candidate image in set G in descending order according to their focus scores, when compared with each of the other candidate images in set G having a focus score not greater than the focus score of the given candidate image, the other candidate image is removed from set G if the viewed region distance between the given candidate image and the other candidate image is below the predefined threshold value (step 312). The images remaining in G represent the selected third subset of candidate images that are then moved to set S (step 314).

Figure 4:
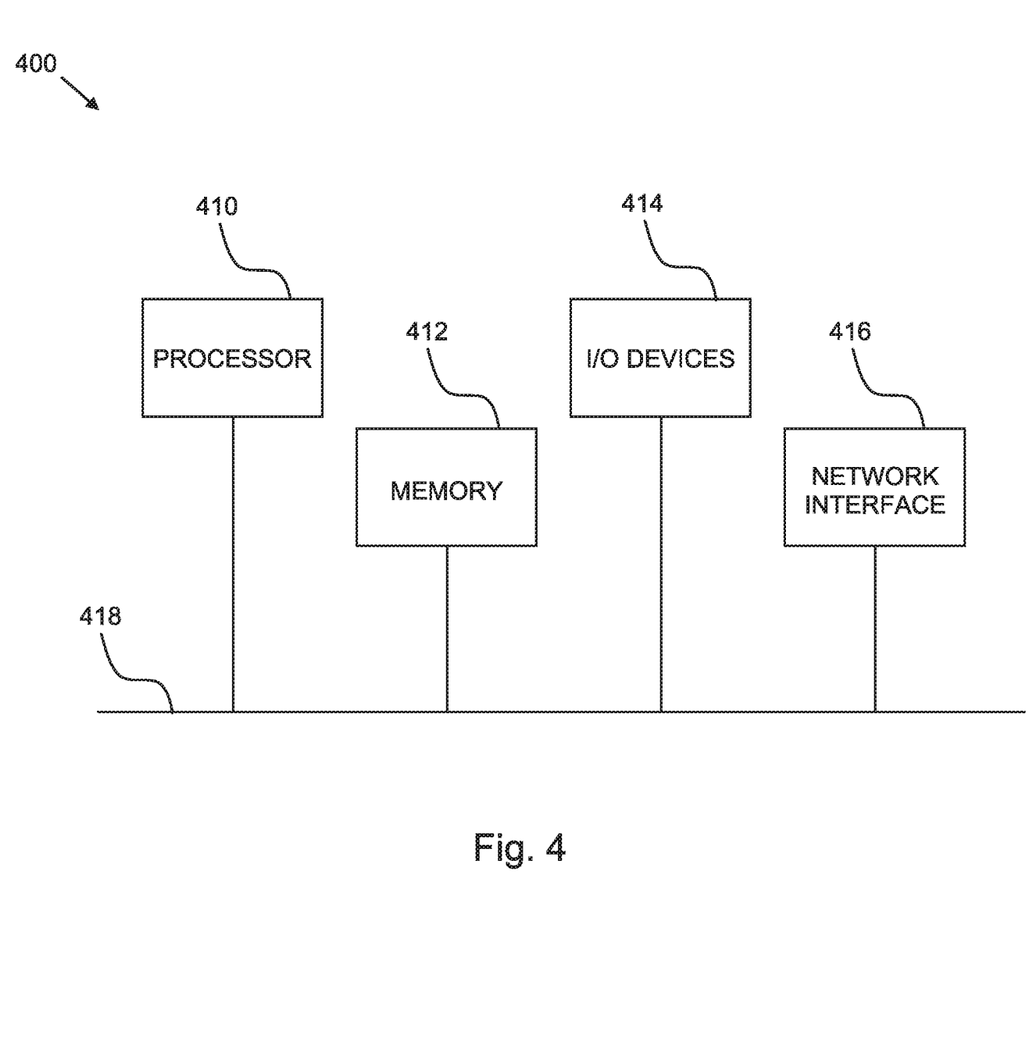
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1A-3) may be implemented, according to an embodiment of the invention. As shown, the invention may be implemented in accordance with a processor 410, a memory 412, I/O devices 414, and a network interface 416, coupled via a computer bus 418 or alternate connection arrangement.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically generating content configured for use with an autonomic augmented reality system, the method comprising:

constructing a three-dimensional model of a scene that includes an object,
wherein the constructing is performed using a plurality of images of the scene recorded during a remotely-guided augmented reality session,
wherein each of the images is recorded from a camera position defined relative to a first set of three-dimensional axes associated with the images, and
wherein the three-dimensional model includes a plurality of camera positions defined relative to a second set of three-dimensional axes associated with the three-dimensional model;

registering the first set of three-dimensional axes with the second set of three-dimensional axes by matching a trajectory derived from the camera positions of the images to a trajectory derived from the camera positions of the three-dimensional model, thereby determining a session-to-model transform;

translating, using the session-to-model transform, positions of a plurality of points of interest indicated on the object during the remotely-guided augmented reality session, to positions of corresponding points of interest on the object within the three-dimensional model, where the positions of the points of interest indicated on the object during the remotely-guided augmented reality session are defined relative to the first set of three-dimensional axes and the positions of the corresponding points of interest on the object within the three-dimensional model are defined relative to the second set of three-dimensional axes; and generating a content package configured for use with an autonomic augmented reality system, where the content package includes the three-dimensional model, the positions of the points of interest on the object within the three-dimensional model, and annotations provided during the remotely-guided augmented reality session in association with the points of interest indicated on the object during the remotely-guided augmented reality session, wherein the constructing, registering, translating, and generating are implemented in any of a) computer hardware, and b) computer software embodied in a non-transitory, computer-readable medium.

2. The method according to claim 1 and further comprising selecting the plurality of images from a set of candidate images of the scene recorded during the remotely-guided augmented reality session, wherein the selecting comprises selecting a first subset of the candidate images where in each candidate image of the first subset any of the points of interest are indicated during the remotely-guided augmented reality session.

3. The method according to claim 2 wherein the selecting comprises selecting a second subset of the candidate images exclusive of the first subset, where for each given previously-selected image in a set of previously-selected images, when compared with each given candidate image of the second subset, an aggregate of two-dimensional distances between projected positions of the sparse point cloud points in the given previously-selected image and the given candidate image is not below a predefined threshold value.

4. The method according to claim 3 wherein the selecting comprises selecting a third subset of the candidate images exclusive of the first and second subsets, where for each given candidate image having a focus score representing the extent to which the object is in the center of the given candidate image, when compared in descending focus score order with each of the other candidate images having a focus score not greater than the focus score of the given candidate image, an aggregate of two-dimensional distances between projected positions of the sparse point cloud points in the given candidate image and the other candidate image is not below the predefined threshold value.

5. The method according to claim 1 wherein the generating comprises generating the content package to include a plurality of time-based annotations, where each of the time-based annotations is associated with a different time offset relative to the start of the remotely-guided augmented reality session, and where each of the time-based annotation is provided during the remotely-guided augmented reality session.

6. The method according to claim 1 and further comprising removing from the three-dimensional model any other object within the scene that has no associated points of interest.

7. A system for automatically generating content configured for use with an autonomic augmented reality system, the system comprising:

a model generator configured to construct a three-dimensional model of a scene that includes an object, wherein the model generator is configured to construct the three-dimensional model using a plurality of images of the scene recorded during a remotely-guided augmented reality session, wherein each of the images is recorded from a camera position defined relative to a first set of three-dimensional axes associated with the images, and wherein the three-dimensional model includes a plurality of camera positions defined relative to a second set of three-dimensional axes associated with for the three-dimensional model;

axis registration apparatus configured to register the first set of three-dimensional axes with the second set of three-dimensional axes by matching a trajectory derived from the camera positions of the images to a trajectory derived from the camera positions of the three-dimensional model, and thereby determine a session-to-model transform;

translation apparatus configured to translate, using the session-to-model transform, positions of a plurality of points of interest indicated on the object during the remotely-guided augmented reality session, to positions of corresponding points of interest on the object within the three-dimensional model, where the positions of the points of interest indicated on the object during the remotely-guided augmented reality session are defined relative to the first set of three-dimensional axes and the positions of the corresponding points of interest on the object within the three-dimensional model are defined relative to the second set of three-dimensional axes; and content generation apparatus configured to generate a content package configured for use with an autonomic augmented reality system, where the content package includes the three-dimensional model, the positions of the points of interest on the object within the three-dimensional model, and annotations provided during the remotely-guided augmented reality session in association with the points of interest indicated on the object during the remotely-guided augmented reality session, wherein the model generator, the axis registration apparatus, the translation apparatus, and the content generation apparatus are implemented in any of a) computer hardware, and b) computer software embodied in a non-transitory, computer-readable medium.

8. The system according to claim 7 and further comprising an image selector configured to select the plurality of images from a set of candidate images of the scene recorded during the remotely-guided augmented reality session.

9. The system according to claim 8 wherein the image selector is configured to select a first subset of the candidate images where in each candidate image of the first subset any of the points of interest are indicated during the remotely-guided augmented reality session.

10. The system according to claim 9 wherein the image selector is configured to select a second subset of the candidate images exclusive of the first subset, where for each given previously-selected image in a set of previously-selected images, when compared with each given candidate image of the second subset, an aggregate of two-dimensional distances between projected positions of the sparse point cloud points in the given previously-selected image and the given candidate image is not below a predefined threshold value.

11. The system according to claim 10 wherein the image selector is configured to select a third subset of the candidate images exclusive of the first and second subsets, where for each given candidate image having a focus score representing the extent to which the object is in the center of the given candidate image, when compared in descending focus score order with each of the other candidate images having a focus score not greater than the focus score of the given candidate image, an aggregate of two-dimensional distances between projected positions of the sparse point cloud points in the given candidate image and the other candidate image is not below the predefined threshold value.

12. The system according to claim 7 wherein the content package includes a plurality of time-based annotations, where each of the time-based annotations is associated with a different time offset relative to the start of the remotely-guided augmented reality session, and where each of the time-based annotation is provided during the remotely-guided augmented reality session.

13. The system according to claim 7 and further comprising a model cleaner configured to remove from the three-dimensional model any other object within the scene that has no associated points of interest.

14. A computer program product for automatically generating content configured for use with an autonomic augmented reality system, the computer program product comprising:
a non-transitory, computer-readable storage medium; and
computer-readable program code embodied in the storage medium, wherein the computer-readable program code is configured to
construct a three-dimensional model of a scene that includes an object,
using a plurality of images of the scene recorded during a remotely-guided augmented reality session,
wherein each of the images is recorded from a camera position defined relative to a first set of three-dimensional axes associated with the images, and
wherein the three-dimensional model includes a plurality of camera positions defined relative to a second set of three-dimensional axes associated with the three-dimensional model,
register the first set of three-dimensional axes with the second set of three-dimensional axes by matching a trajectory derived from the camera positions of the images to a trajectory derived from the camera positions of the three-dimensional model, thereby determining a session-to-model transform,
translate, using the session-to-model transform, positions of a plurality of points of interest indicated on the object during the remotely-guided augmented reality session, to positions of corresponding points of interest on the object within the three-dimensional model, where the positions of the points of interest indicated on the object during the remotely-guided augmented reality session are defined relative to the first set of three-dimensional axes and the positions of the corresponding points of interest on the object within the three-dimensional model are defined relative to the second set of three-dimensional axes, and
generate a content package configured for use with an autonomic augmented reality system, where the content package includes the three-dimensional model, the positions of the points of interest on the object within the three-dimensional model, and annotations provided during the remotely-guided augmented reality session in association with the points of interest indicated on the object during the remotely-guided augmented reality session.

15. The computer program product according to claim 14 wherein the computer-readable program code is configured to select the plurality of images from a set of candidate images of the scene recorded during the remotely-guided augmented reality session, wherein the selecting comprises selecting a first subset of the candidate images where in each candidate image of the first subset any of the points of interest are indicated during the remotely-guided augmented reality session.

16. The computer program product according to claim 15 wherein the computer-readable program code is configured to select a second subset of the candidate images exclusive of the first subset, where for each given previously-selected image in a set of previously-selected images, when compared with each given candidate image of the second subset, an aggregate of two-dimensional distances between projected positions of the sparse point cloud points in the given previously-selected image and the given candidate image is not below a predefined threshold value.

17. The computer program product according to claim 16 wherein the computer-readable program code is configured to select a third subset of the candidate images exclusive of the first and second subsets, where for each given candidate image having a focus score representing the extent to which the object is in the center of the given candidate image, when compared in descending focus score order with each of the other candidate images having a focus score not greater than the focus score of the given candidate image, an aggregate of two-dimensional distances between projected positions of the sparse point cloud points in the given candidate image and the other candidate image is not below the predefined threshold value.

18. The computer program product according to claim 14 wherein the computer-readable program code is configured to generate the content package to include a plurality of time-based annotations, where each of the time-based annotations is associated with a different time offset relative to the start of the remotely-guided augmented reality session, and where each of the time-based annotation is provided during the remotely-guided augmented reality session.

19. The computer program product according to claim 14 wherein the computer-readable program code is configured to remove from the three-dimensional model any other object within the scene that has no associated points of interest.

* * * * *